(12) United States Patent    (10) Patent No.: US 8,611,309 B2
Wang et al.    (45) Date of Patent: Dec. 17, 2013

(54) ROAMING ENCODED INFORMATION READING TERMINAL

(76) Inventors: Ynjiun P. Wang, Cupertino, CA (US); Huyu Qu, San Jose, CA (US)

( * ) Notice: Subject to any disclaimer, the term of this patent is extended or adjusted under 35 U.S.C. 154(b) by 0 days.

(21) Appl. No.: 13/470,510

(22) Filed: May 14, 2012

(65) Prior Publication Data

US 2012/0287910 A1    Nov. 15, 2012

Related U.S. Application Data

(62) Division of application No. 12/070,895, filed on Feb. 21, 2008, now Pat. No. 8,179,859.

(51) Int. Cl.
*H04W 4/00* (2009.01)

(52) U.S. Cl.
USPC .......................................... 370/331; 370/332

(58) Field of Classification Search
USPC ......... 370/331, 310, 351, 334, 338, 341, 313, 370/315, 318, 324, 329, 332; 235/439
See application file for complete search history.

(56) References Cited

U.S. PATENT DOCUMENTS

| | | | |
|---|---|---|---|
| 5,029,183 A | 7/1991 | Tymes | |
| 5,157,687 A | 10/1992 | Tymes | |
| 5,479,441 A | 12/1995 | Tymes et al. | |
| 6,067,297 A | 5/2000 | Beach | |
| 6,535,493 B1 | 3/2003 | Lee et al. | |
| 6,728,545 B1 | 4/2004 | Belcea | |
| 6,754,188 B1 | 6/2004 | Garahi et al. | |
| 6,760,444 B1 | 7/2004 | Leung | |
| 6,771,666 B2 | 8/2004 | Barker, Jr. | |
| 6,799,204 B1 | 9/2004 | Baba et al. | |
| 6,804,720 B1 | 10/2004 | Vilander et al. | |
| 6,822,955 B1 | 11/2004 | Brothers et al. | |
| 6,845,091 B2 | 1/2005 | Ogier et al. | |
| 6,856,624 B2 | 2/2005 | Magret | |
| 6,862,274 B1 | 3/2005 | Tsao et al. | |
| 6,917,605 B2 | 7/2005 | Kakemizu et al. | |
| 6,934,274 B2 | 8/2005 | Inoue et al. | |
| 6,957,275 B1 | 10/2005 | Sekiguchi et al. | |

(Continued)

OTHER PUBLICATIONS

Information Sciences Institute, University of Southern California, 4676 Admiralty Way, Marina Del Ray, CA 90291, Transmission Control Protocol, DARPA Internet Program Protocol Specification, Sep. 1981. 91 pages.

(Continued)

*Primary Examiner* — Chi Pham
*Assistant Examiner* — Alexander O Boakye
(74) *Attorney, Agent, or Firm* — Additon, Higgins, Pendleton & Ashe, P.A.

(57) ABSTRACT

A portable encoded information reading (EIR) terminal for incorporation in a data collection system having a host computer, a plurality of peer EIR terminals, and a plurality of interconnected networks including one or more wireless networks, can comprise a central processing unit (CPU), a memory, an encoded information reading (EIR) device, and at least one wireless communication interface. The EIR terminal can be associated with a home network and have a home address belonging to the address range associated with the home network. The EIR terminal can participate in one or more communication sessions and exchange messages, at least one of which can include decoded message data corresponding to an encoded message, with the host computer. The EIR terminal can maintain active communication sessions using its home address when roaming between the interconnected networks.

16 Claims, 11 Drawing Sheets

(56) References Cited

U.S. PATENT DOCUMENTS

| | | |
|---|---|---|
| 6,963,582 B1 | 11/2005 | Xu |
| 6,965,948 B1 | 11/2005 | Eneborg et al. |
| 6,977,938 B2 | 12/2005 | Alriksson et al. |
| 6,982,967 B1 | 1/2006 | Leung |
| 6,987,743 B2 | 1/2006 | Chen et al. |
| 6,988,146 B1 | 1/2006 | Magret et al. |
| 7,002,932 B1 | 2/2006 | Young et al. |
| 7,009,950 B1 | 3/2006 | Hirata et al. |
| 7,020,120 B2 | 3/2006 | Inoue et al. |
| 7,020,464 B2 | 3/2006 | Bahl et al. |
| 7,032,009 B2 | 4/2006 | Dowling |
| 7,035,932 B1 | 4/2006 | Dowling |
| 7,039,358 B1 | 5/2006 | Shellhammer et al. |
| 7,072,314 B2 | 7/2006 | Saint-Hilaire et al. |
| 7,082,114 B1 | 7/2006 | Engwer et al. |
| 7,088,698 B1 | 8/2006 | Harsch |
| 7,089,313 B2 | 8/2006 | Lee et al. |
| 7,113,599 B2 | 9/2006 | Neves et al. |
| 7,126,945 B2 | 10/2006 | Beach |
| 7,130,614 B2 | 10/2006 | Sreemanthula et al. |
| 7,130,629 B1 | 10/2006 | Leung et al. |
| 7,136,389 B2 | 11/2006 | Shahrier et al. |
| 7,143,171 B2 | 11/2006 | Eriksson et al. |
| 7,146,418 B2 | 12/2006 | Bahl |
| 7,149,229 B1 | 12/2006 | Leung |
| 7,152,238 B1 | 12/2006 | Leung et al. |
| 7,168,090 B2 | 1/2007 | Leung |
| 7,173,917 B1 | 2/2007 | Narayanan et al. |
| 7,188,185 B2 | 3/2007 | Dowling |
| 7,191,226 B2 | 3/2007 | Flykt et al. |
| 7,197,308 B2 | 3/2007 | Singhal et al. |
| 7,197,569 B2 | 3/2007 | Dowling |
| 7,212,505 B2 | 5/2007 | Saint-Hilaire et al. |
| 7,218,634 B1 | 5/2007 | Khalil et al. |
| 7,221,666 B2 | 5/2007 | Inoue et al. |
| 7,228,355 B2 | 6/2007 | Dowling |
| 7,246,373 B1 | 7/2007 | Leung et al. |
| 7,248,572 B2 | 7/2007 | Bender et al. |
| 7,280,495 B1 | 10/2007 | Zweig et al. |
| 7,293,077 B1 | 11/2007 | Teo et al. |
| 7,293,110 B2 | 11/2007 | Dowling |
| 7,299,301 B1 | 11/2007 | Verma et al. |
| 7,315,526 B2 | 1/2008 | Zhang et al. |
| 7,349,377 B2 | 3/2008 | Le et al. |
| 7,349,380 B2 | 3/2008 | Baker, Jr. et al. |
| 7,874,483 B2 | 1/2011 | Wang et al. |
| 8,179,859 B2* | 5/2012 | Wang et al. ............. 370/331 |
| 2007/0045424 A1 | 3/2007 | Wang |

OTHER PUBLICATIONS

Network Working Group, C. Perkins, Editor, IBM, Request for Comments, 2002, Category: Standards Track, IP Mobility Support, Oct. 1996, 79 pages.

Network Working Group, Y. Rekhter (Cicso Systems), B. Moskowitz (Chrysler Corp.), D. Karrenberg (RIPE NCC), G.J. de Groot (RIPE NCC), E. Lear (Silicon Graphics, Inc.), Request for Comments, 1918 Obsoletes: 1627, 1597, BCP: 5, Category: Best Current Practice, Feb. 1996. (9 pages).

IEEE Standards Board, Information Technology—Telecommunications and Information Exchange Between Systems—Local and Metropolitan Area Networks—Specific Requirements, Part 11: Wireless LAN Medium Access Control (MAC) and Physical Layer (PHY) Specifications, ANSIIEEE Std. 802.11, 1999 Edition (R2003), Reaffirmed Jun. 12, 2003. 528 pages.

Network Working Group, C. Perkins, Editor, Nokia Research Center, Request for Comments: 2002, Obsoletes: 3220, Category: Standards Track, IP Mobility Support for IPv4, Aug. 2002. 99 pages.

Flickenger, Rob, Building Wireless Community Networks, 2nd Edition, dated Jul. 2003. 23 pages.

IEEE 802.11 Wireless LAN Client, Cicso Systems Compliance Specifications, [Cisco Client Extensions (CCX)] Version 1.23, EDCS-219858, dated Sep. 2006. 101 pages.

Cisco Compatible Extensions for WLAN Devices, Version 3.0.14, EDCS-334349, dated Nov. 2006. 113 pages.

Cisco Compatible Extensions for WLAN Devices, Version 4.0.49, EDCS-383078, dated Nov. 2006. 166 pages.

Cisco Compatible Extensions for WLAN Devices, Version 2.1.8, EDCS-262398, dated Aug. 2006. 166 pages.

IEEE Standards Board, Information Technology—Telecommunications and Information Exchange Between Systems—Local and Metropolitan Area Networks—Specific Requirements. Part 11: Wireless LAN Medium Access Control (MAC) and Physical Layer (PHY) Specifications, Amendment prepared by the 802.11 Working Group of the IEEE 802 Committee, 2007. 259 pages.

* cited by examiner

200 Mobility Binding Table

| 210 Home IP address | 220 Care-of IP address | |
|---|---|---|
| | | |
| | | |
| | | |
| | | |
| | | |
| | | |
| | | |
| | | |

Fig. 2

| Version | IHL | Type of Service | Total Length | |
|---|---|---|---|---|
| Identification | | | Flags | Fragment Offset |
| Time to Live | | Protocol | Header Checksum | |
| Source IP address | | | | |
| 310 Destination IP address | | | | |
| Options | | | | Padding |
| 320 Payload: 301 Original IP Datagram | | | | |

400 Visitor List

| 410 Home address | 420 Home agent address | 430 MAC address |
|---|---|---|
| | | |
| | | |
| | | |
| | | |
| | | |
| | | |
| | | |

Fig. 4a

400 Visitor List

| 440 Co-located care-of address | 420 Home agent address | 430 MAC address |
|---|---|---|
| | | |
| | | |
| | | |
| | | |
| | | |
| | | |
| | | |

Fig. 4b

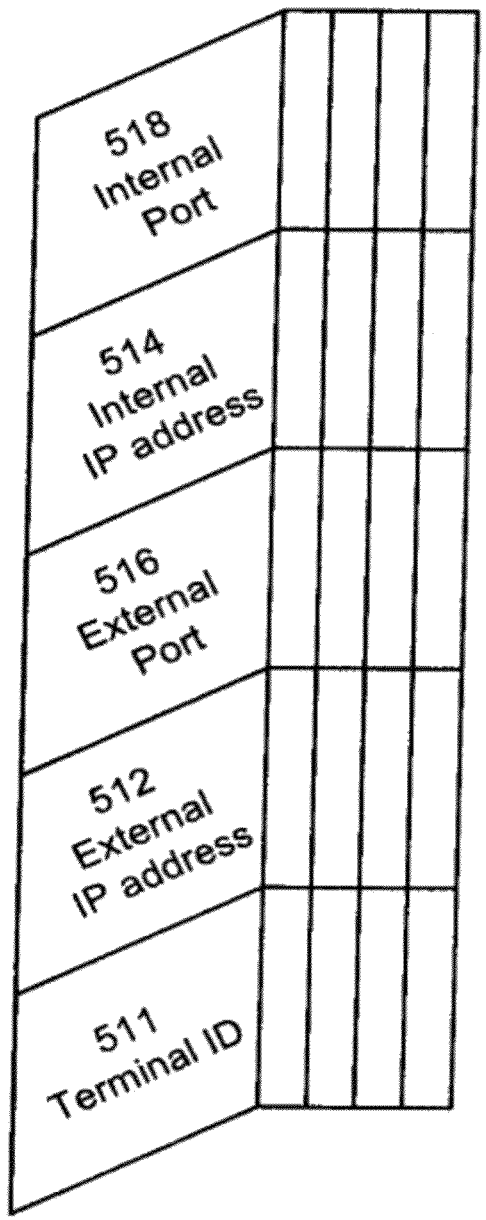

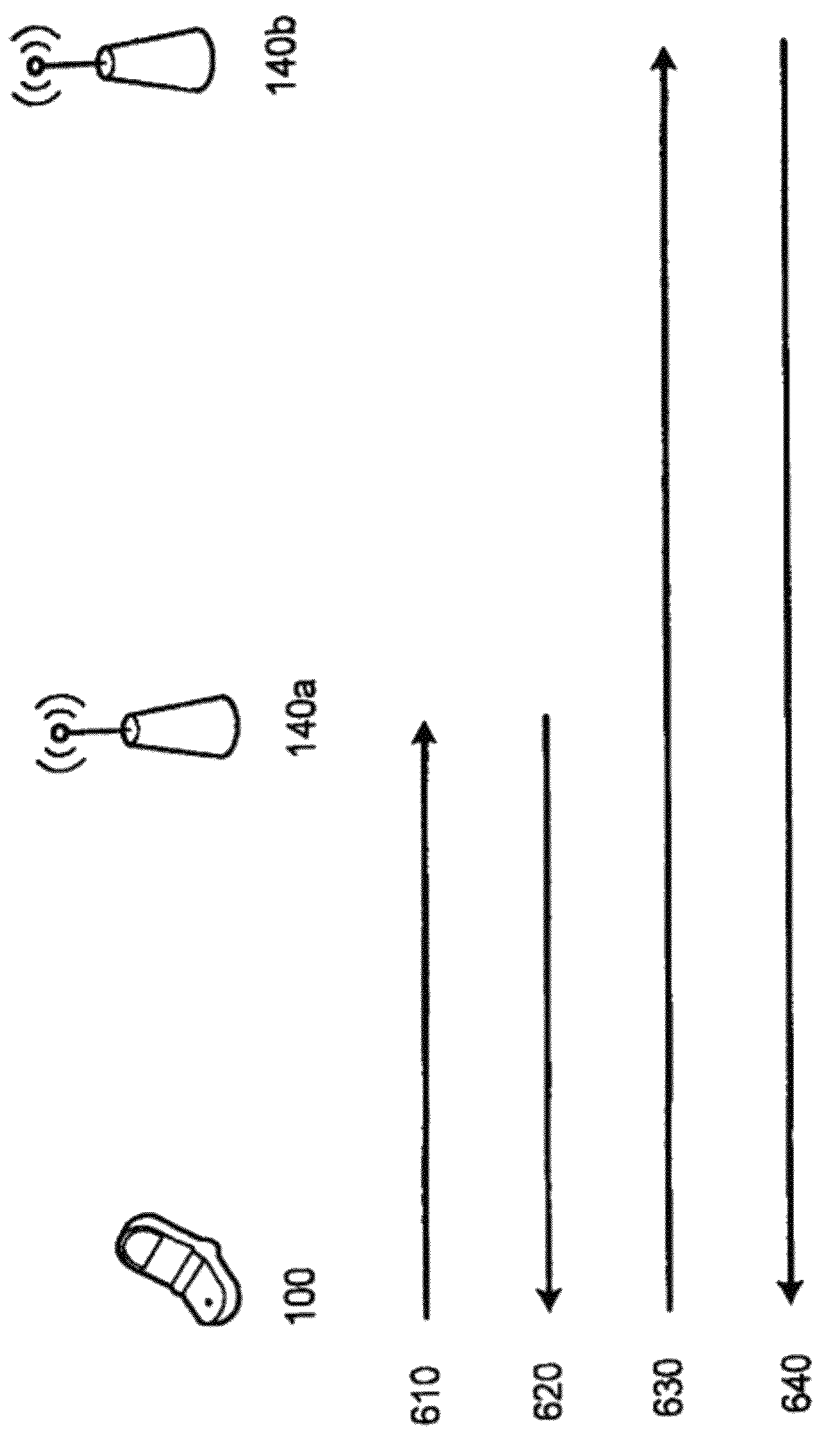

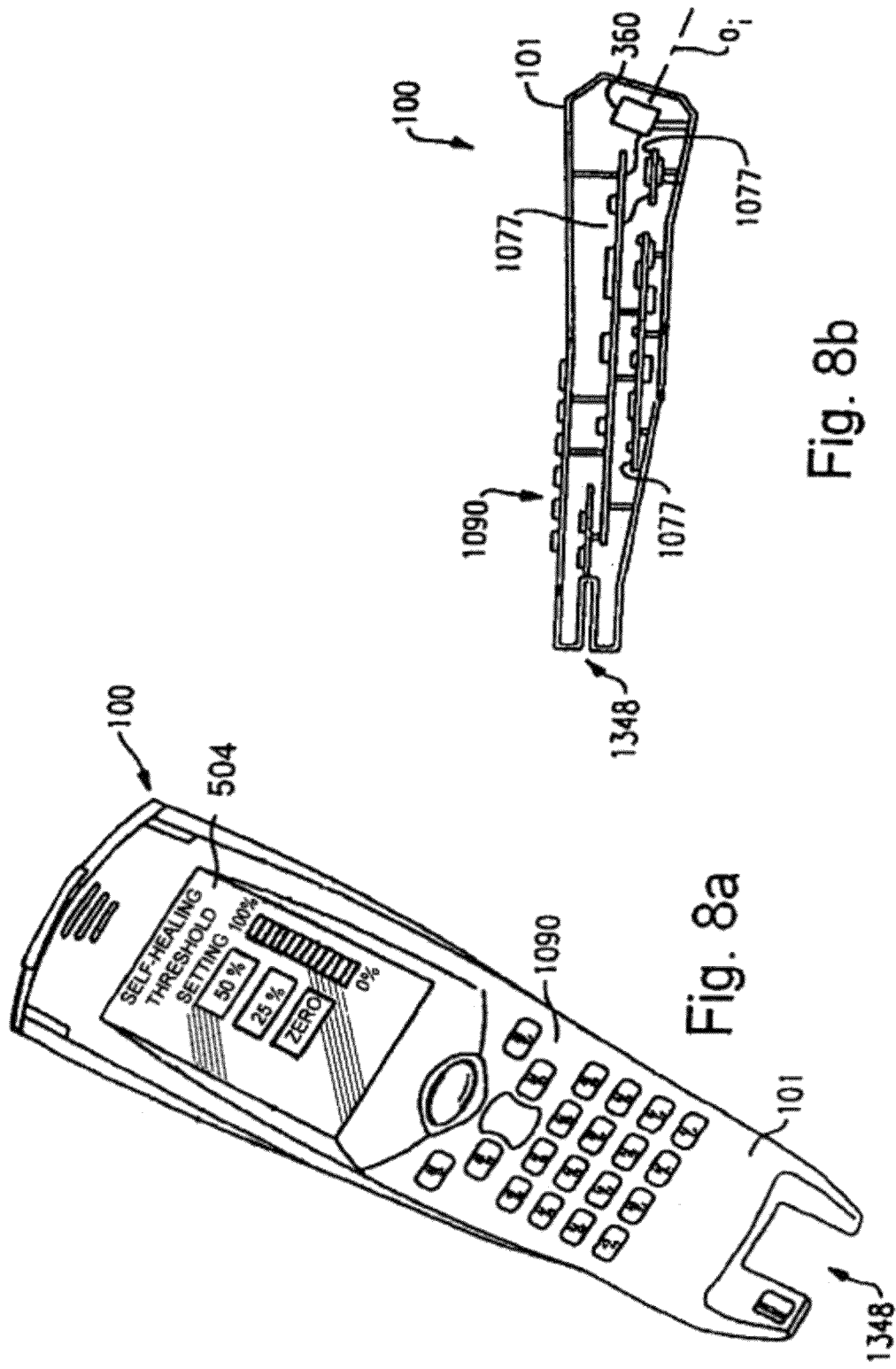

ROAMING ENCODED INFORMATION READING TERMINAL

CROSS REFERENCE TO RELATED APPLICATIONS

This application is a divisional of U.S. patent application Ser. No. 12/070,895 filed Feb. 21, 2008, entitled "Roaming Encoded Information Reading Terminal." The priority of the above identified application is claimed and the above identified application is incorporated herein by reference in its entirety.

FIELD OF THE INVENTION

The invention is generally related to data collection systems employing encoded information reading (EIR) terminals and is specifically related to a system and method of data communication in a data collection system employing EIR terminals.

BACKGROUND OF THE INVENTION

Encoded information reading (EIR) terminals equipped with wireless communication interfaces are widely used in retail stores, shipping facilities, etc. The protocol most widely used for providing data communications within the data collection system employing EIR terminals is Internet Protocol (IP) version 4. The routing scheme of IPv4 determines the destination network information from the destination IP address of a datagram. This can be analogized to the "old" phone numbering scheme (which became out-of-dated with the introduction of phone number portability), where an area code and a three-digit prefix determined the geographical location of the land-line phone. Whenever a land-line phone subscriber moved from a geographical zone served by one local exchange to a geographical zone served by another local exchange, the subscriber's phone number would change to satisfy the area code and local exchange-based numbering scheme. An IPv4 address consists of network address bits and host address bits, as defined by a netmask. Continuing the analogy, the network address bits can be considered playing the role of the area code and local exchange part of the phone number. Hence, whenever a networked device moves out of the zone served by the network defined by the network address bits of the device's IP address, the device must change its IP address, since IPv4 routing would not work and IP datagrams to the device would not be delivered if the device is connected to a network whose network address is different from the network part of the device's IP address.

The requirement of changing the IP address by a roaming device is not of a great concern unless the device, e.g., an EIR terminal equipped with a wireless network interface, moves from one network to another while at least one communication session (e.g., a TCP connection) in which the terminal participates, is active: the TCP connection would be lost immediately upon the terminal changing its IP address.

Accordingly, there is a need for a method of keeping the active communication session alive while a wireless networked device, e.g., an EIR terminal, is roaming from one network to another.

BRIEF DESCRIPTION OF THE DRAWINGS

FIG. 2 illustrates an exemplary embodiment of the mobility binding table structure according to the invention.

FIG. 3 illustrates an exemplary embodiment of IP datagram encapsulation.

FIGS. 4a-4b illustrate exemplary embodiments of the visitor list structure according to the invention.

FIG. 5b illustrates a structure of a network address translation (NAT) table according to the invention.

FIG. 6 illustrates a sequence of disassociation and association requests by a roaming EIR terminal, and corresponding disassociation and association responses by wireless access points or portals.

FIGS. 8a and 8b illustrate an exemplary hand held EIR terminal housing.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
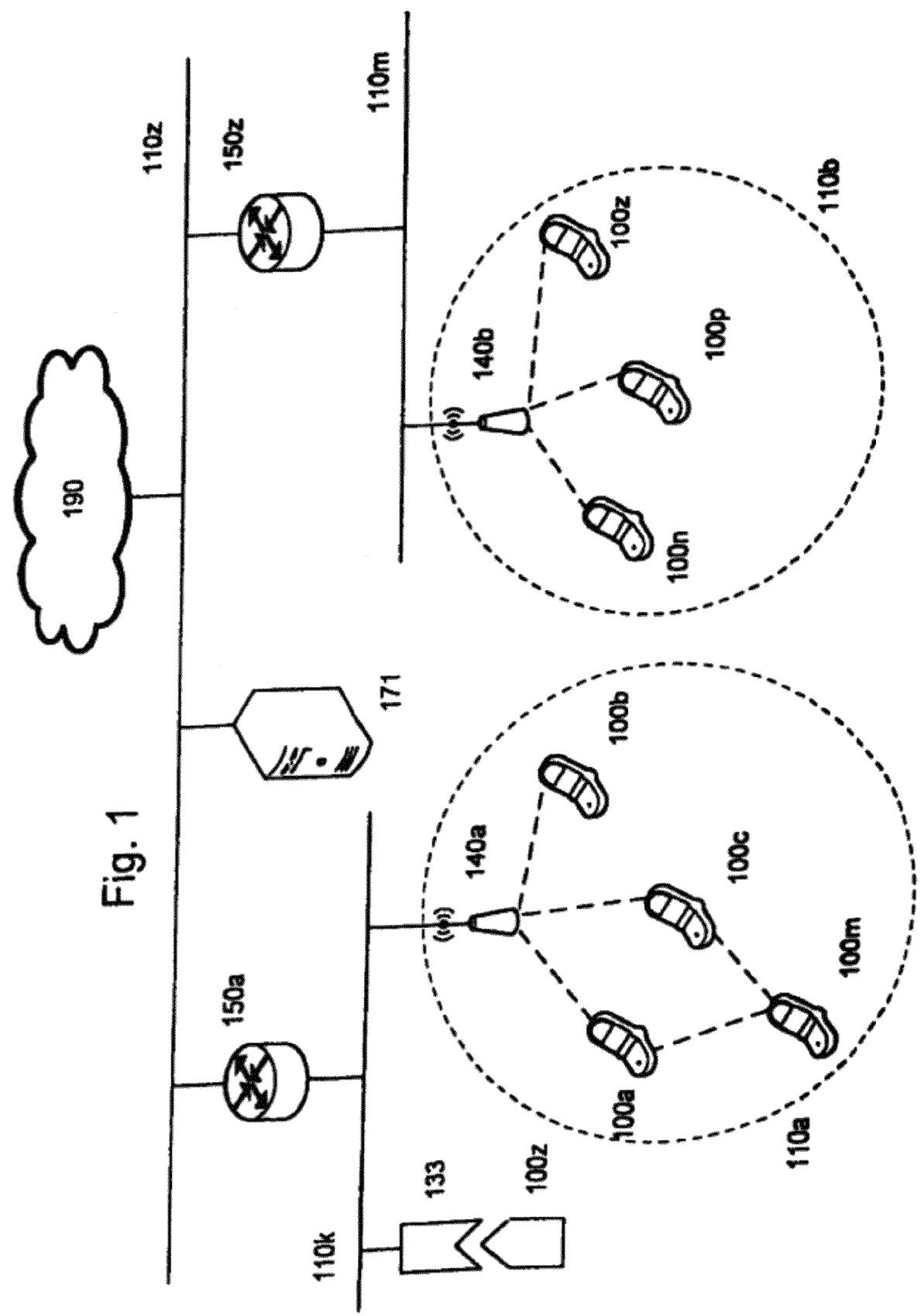
FIG. 1 illustrates a network-level view of an embodiment of a data collection system employing EIR terminals according to the invention.

There is provided a portable encoded information reading (EIR) terminal for incorporation in a data collection system. The data collection system, schematically shown in FIG. 1, can include a plurality of EIR terminals 100a-100z in communication with a plurality of interconnected networks 110a-110z. In one aspect, one of the networks 110a-110z can be connected to the Internet 190. In another aspect, one or more networks of the plurality of networks 110a-110z can act as an OSI layer 2 network implementing IEEE 802.2 Logical Link Control, i.e., can appear to be functionally equivalent to a broadcast Ethernet-based LAN from the perspective of other networks and higher level protocols. The plurality of networks 110a-110z can include at least one IEEE 802.11-conformant wireless network In one aspect, the networks 110a-110z can be interconnected via one or more one or more routers 150a-150z. In another aspect, a router can be provided by a wireless portal routing datagrams between a wireless and a non-wireless network, e.g., wireless portal 140a in FIG. 1. In a further aspect, a wireless portal can be collocated with a wireless access point (AP).

In another aspect, an EIR terminal can establish one or more wireless links with one or more peer EIR terminals, with a wireless AP, or with a wireless portal. The EIR terminal can provide IEEE 802.11-conformant wireless distribution system services, including association, disassociation, distribution, integration, and re-association, to the peer EIR terminals, thus acting as a wireless mesh access point (MAP) or a wireless mesh point portal (MPP).

In another aspect, a wireless AP or portal can be provided, e.g., by an infrastructure AP or portal, or by a mesh point terminal providing IEEE 802.11-conformant wireless distribution system services to its peer EIR terminals.

While different networks are designated herein, it is recognized that a single network as seen from the network layer of the Open System Interconnection (OSI) model can comprise a plurality of lower layer networks, e.g., what can be regarded as a single Internet Protocol (IP) network, can include a plurality of different physical networks.

In a further aspect, the data collection system can further include a router 150k routing datagrams between the networks 110a-110z and at least one host computer 171. In one embodiment, the host computer 171 can host a retail store inventory database including, e.g., a product information table, a pricing table, and an inventory table. In another embodiment, the host computer 171 can host a shipment database including, e.g., an item tracking table. A skilled artisan would appreciate the fact that other applications running on the host computer are within the scope and spirit of the invention.

An EIR terminal 100c can establish a communication session with the host computer 171. In one embodiment, the communications between the EIR terminal 100c and the host computer 171 can comprise a series of HTTP requests and responses transmitted over one or more TCP connections, although a person skilled in the art would appreciate the fact that using other transport and application level protocols is within the scope and the spirit of the invention. In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tacking record for an item identified by a bar code label attached to the product.

Under the teachings of the prior art, if the EIR terminal 100 was physically moved (e.g., by the terminal operator) from the wireless transmission range of the wireless AP or portal 140a into the wireless transmission range of the wireless AP or portal 140b, the EIR terminal would have to change its IP address upon associating with the new wireless AP or portal 140b, and hence all the existing communication sessions (e.g., TCP connections in an IP network) with the host computer 171 would be terminated, since the datagrams addressed to the old IP address would not reach the EIR terminal.

In accordance with the one embodiment of the invention, the EIR terminal 110 always keeps its permanent IP address, so that the EIR terminal 110 can maintain all the active communication sessions using the permanent IP address when roaming between the networks 110a-110z. In order to continue to receive datagrams routed in accordance with the IPv4 routing algorithm, the EIR terminal can be associated with a temporary IP address to which datagrams can be delivered using conventional IPv4 routing. A router having an interface on the network identified by the network part of the permanent IP address can be notified of the temporary IP address of the roaming EIR terminal, so that the router would be able to forward to the terminal the datagrams addressed to the permanent IP address.

In one aspect, the functionality related to using a temporary IP address can be implemented in accordance with RFC 3344 by Network Working Group.

An EIR terminal can have a home network whose address space can include the terminal's permanent IP address. The permanent IP address can be also referred to as a home address. In one aspect, the home network can be identified by the network part of the terminal's permanent IP address.

In one embodiment, the home network can be provided by a wireless network, e.g., the wireless network 110a can be a home network for the EIR terminal 100a, as shown in FIG. 1. In another embodiment, the home network can be provided by a wired network, e.g., the wired network 110k can be a home network for the EIR terminal 100z which can connect to the network 110k via a docking station 133. Any network of the data collection system which is different from an EIR terminal's home network, is referred to as a foreign network. While being connected to a foreign network, the EIR terminal can be associated with a temporary IP address, also referred to as a care-of address.

For example, for the EIR terminal 100a of FIG. 1, the wireless network 110a can be the home network, and the wireless network 110b can be a foreign network if the EIR terminal is physically moved within the wireless transmission range and is associated with the wireless AP or portal 140b. For the EIR terminal 100z of FIG. 1, the wired network 110k can be the home network, and the wireless network 110a or 110b can be a foreign network if the EIR terminal is physically moved within the wireless transmission range and is associated with the respective wireless AP or portal 140a or 140b.

In one embodiment, a home address can be permanently assigned to an EIR terminal using a manual or an automated procedure. In another embodiment, a home address can be assigned to an EIR terminal using Dynamic Host Configuration Protocol (DHCP) upon the EIR terminal association with the home network. A skilled artisan would appreciate the fact that other ways of assigning the home address to an EIR terminal are within the scope and the spirit of the invention.

The data collection system can include one or more mobility agents, including home agents and foreign agents, which facilitate the EIR terminal roaming functionality. An EIR terminal can be associated with a home agent. The home agent functionality can be provided by a router having an interface on the EIR terminal's home network. For example, an EIR terminal 110a can be associated with a home agent provided by the wireless AP or portal 140a.

In one aspect, a home agent can maintain current location information for a roaming EIR terminal. In one embodiment, a home agent can maintain a mobility binding table. The mobility binding table 200 can have a structure shown in FIG. 2 and can contain a plurality of mobility binding entries. A mobility binding entry can contain a home address 210 and a care-of address 220 of a roaming EIR terminal. A skilled artisan would appreciate the fact that other fields can be included in the structure of a mobility binding entry.

In another aspect, a home agent can be adapted to forward IP datagrams addressed to a roaming EIR terminal's home address, so that the datagrams would be delivered to the roaming EIR terminal via a router having an interface on a foreign network. In one embodiment, the home agent can be adapted to perform tunneling of the IP datagrams addressed to a roaming EIR terminal, by encapsulating each IP datagram into a new IP datagram as shown in FIG. 3. The IP destination field 310 of the new IP datagram 300 can contain the care-of address of the roaming EIR terminal. The original IP datagram 301 can be put into the payload part 320 of the new IP datagram 300. A skilled artisan would appreciate the fact that other ways of tunneling IP datagrams to a roaming EIR terminal by a home agent are within the scope and the spirit of the invention.

On a foreign network, the routing services to a roaming EIR terminal can be provided by a foreign agent. The foreign agent can be provided by a router having an interface on a network visited by an EIR terminal.

When the EIR terminal determines that it has just moved to a new foreign network, it can acquire a new care-of address. In one embodiment, an EIR terminal can get associated with a care-of address advertised by a foreign agent. In another embodiment, an EIR terminal can acquire a care-of address via an external address assignment mechanism (e.g., DHCP; a skilled artisan would appreciate the fact that other IP address assignment mechanisms are within the scope and the spirit of the invention) and associate the acquired care-of address with one of the terminal's network interfaces (e.g., by establishing an IP alias) in order to be able to receive datagrams addressed to the care-of address. The care-of address acquired by an EIR terminal via an external address assignment mechanism is referred to as a co-located IP address.

In one embodiment, the foreign agent can be adapted to receive the tunneled datagrams addressed to the care-of address, de-capsulate the original IP datagrams, look up the roaming EIR terminal by its home address in a visitor list maintained by the foreign agent, and forward them to the roaming EIR terminal using an OSI layer 2 delivery mechanism. In one embodiment, the visitor list 400 can have a structure shown in FIG. 4a and can contain a plurality of visitor list entries. A visitor entry can contain a home address 410, a home agent address 420, and a MAC address 430 of a roaming EIR terminal associated with the foreign agent. In another embodiment, the visitor list entry can have a structure shown in FIG. 4b and can include a co-located care-of address 440, a home agent address 420, and a MAC address 430 of a roaming EIR terminal associated with the foreign agent. A skilled artisan would appreciate the fact that other fields can be included in the structure of a visitor list entry.

In another aspect, the foreign agent can act as a default router for the roaming EIR terminal, so that the EIR terminal would transmit outgoing IP datagrams to the foreign agent for forwarding to the respective destinations.

A mobility agent can advertise its presence on a network by periodically transmitting to a broadcast or a multicast address an agent advertisement message. The agent advertisement message can contain a flag indicating whether the mobility agent transmitting the message is home or foreign agent. In one embodiment, an agent advertisement message transmitted by a foreign agent can contain one or more care-of addresses.

In another aspect, an EIR terminal, instead of waiting for an agent advertisement broadcast, can transmit an agent solicitation message which can be responded to by a mobility agent.

In a further aspect, an EIR terminal can determine, e.g., from an agent advertisement message, that it is has just moved to another network. A skilled artisan would appreciate the fact that other ways of detecting a new network by an EIR terminal, e.g., by associating with a wireless AP or wireless portal, are within the scope and the spirit of the invention.

An EIR roaming on a foreign network can register its care-of address with its home agent by transmitting a registration request message, either directly to the home agent or via a foreign agent. The registration request message can include the terminal's home address, the home agent address, and the care-of address. A skilled artisan would appreciate the fact that the registration request message can further include other fields. The home agent, upon receiving a registration request message, can add a new entry to its mobility binding table.

In one embodiment, the registration request message can contain an authentication extension for authenticating a roaming EIR terminal to its home agent in order to prevent a malicious party from posing as the EIR terminal and thus attempting to intercept IP datagrams intended to be delivered to the EIR terminal. In one aspect, the authentication extension can contain a Security Parameter Index (SPI) followed by an authenticator. The SPI can contain an identifier of an algorithm (e.g., MD5) used to encrypt the authenticator. In another aspect, the authentication extension can further contain one or more unique data items designed to prevent recording and re-play by a malicious party of a valid message exchange between a roaming EIR terminal and its home agent. The unique data items can be generated using timestamps, or randomly generated numbers. A skilled artisan would appreciate the fact that other ways of authenticating a roaming EIR terminal to its home agent, and preventing message recording and re-play are within the spirit and the scope of the invention.

The home agent can be adapted to intercept the datagrams sent to the EIR terminal's home address and forward the IP datagrams to the care-of address via IP encapsulation described herein supra. In a foreign agent care-of address embodiment, the IP datagrams addressed to the care-of address can be received by the foreign agent, which can de-capsulate the original IP datagrams and forward them to the roaming EIR terminal using an OSI layer 2 delivery mechanism. In a co-located care-of address embodiment, the IP datagrams addressed to the care-of address can be received by the EIR terminal itself, which then can perform the de-capsulation of the original IP datagrams.

In another aspect, the wireless AP or portal 140a providing home agent services for a roaming EIR terminal 100a, can be adapted to maintain in its memory a roaming buffer which can be used to buffer MAC frames that can not be delivered to, or have not been acknowledged by the destination EIR terminal. In one embodiment, the EIR terminals 100a-100z and the wireless APs or portals 140a-140z can be IEEE 802.11-conformant, which requires a destination EIR to acknowledge at the physical layer unicast data and control MAC frames. A skilled artisan would appreciate the fact that other types of MAC frame acknowledgements by a destination EIR terminal are within the scope and the spirit of the invention.

In one embodiment, the roaming buffer implemented by a wireless AP or portal providing home agent services for a roaming EIR terminal can extend the functionality of an IEEE 802.11-conformant power save buffer.

The wireless AP providing home agent services for a roaming EIR terminal or portal can start buffering MAC frames responsive to:

(a) receiving a notification from the destination EIR terminal that the EIR terminal is entering power save mode;

(b) receiving a disassociation request from the destination EIR terminal; or (c) not receiving, within a pre-defined timeout, an acknowledgement from the destination EIR terminal responsive to transmitting a unicast data or control MAC frame to the EIR terminal.

The wireless AP or portal providing home agent services for a roaming EIR terminal can forward one or more buffered MAC frames to the destination EIR terminal responsive to:

(a) receiving a power save poll frame from the destination EIR terminal indicating that the EIR terminal is ready to receive any frames which have been buffered by the AP or portal while the terminal was in the power save mode;

(b) receiving a re-association request from the destination EIR terminal;

(c) receiving from the destination EIR terminal an acknowledgement for a previously transmitted unicast data or control MAC frame; or (d) receiving from the destination EIR terminal a registration request message.

A skilled artisan would appreciate the fact that other types of events triggering initiating the frame buffering and forwarding buffered frames by a wireless AP or portal are within the scope and the spirit of the invention.

Figure 5A:
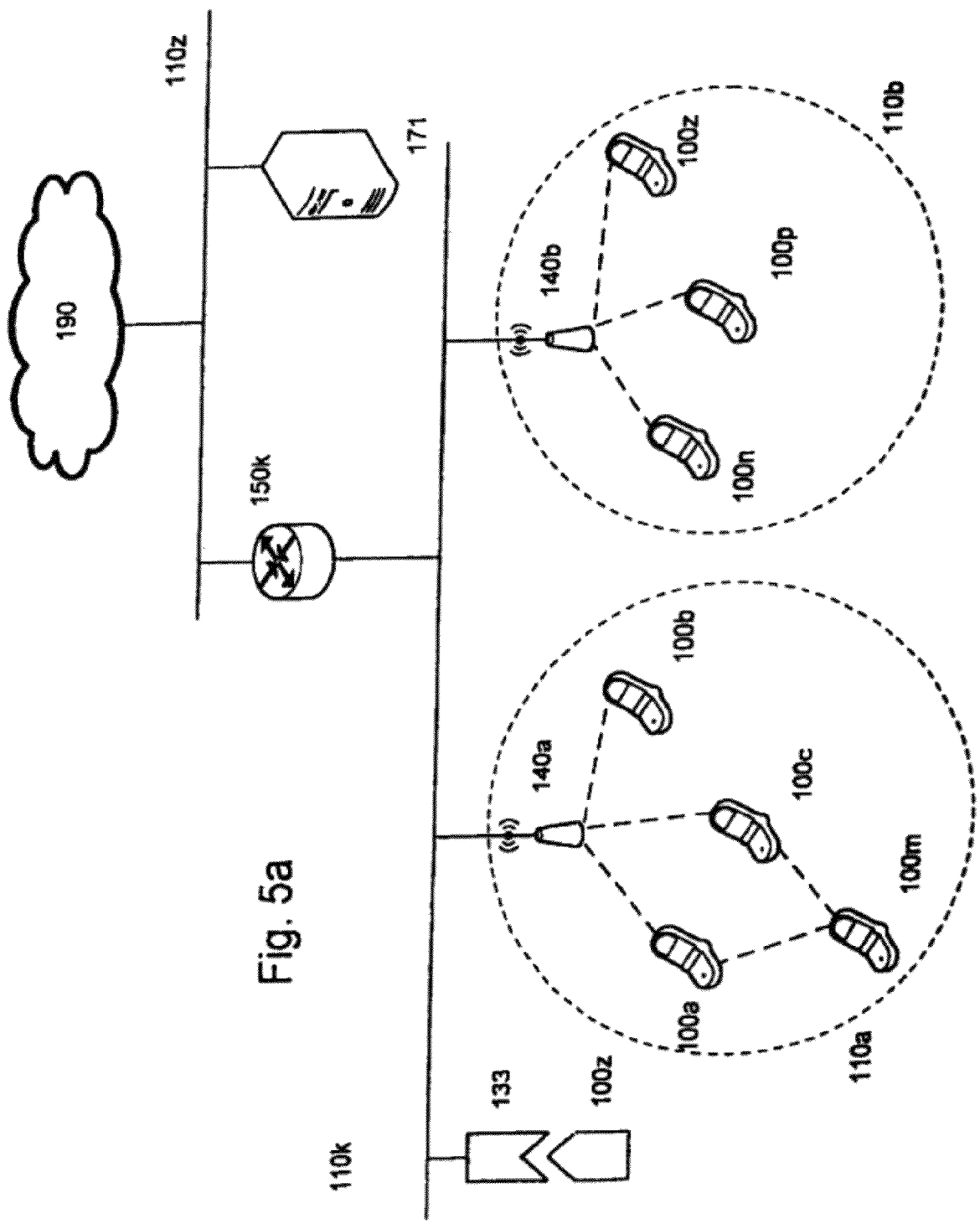
FIG. 5a illustrates a network-level view of an alternative embodiment of a data collection system employing EIR terminals according to the invention.

In another embodiment, shown in FIG. 5a, the gateway router 150k capable of routing IP datagrams between a remote host computer 171 and EIR terminals in communication with local networks 110a-110z, can be adapted to perform network address translation (NAT) on the datagrams routed to and from EIR terminals 100a-100z, by re-writing destination IP addresses and/or port numbers in the datagrams addressed to the EIR terminals 100a-100z, and re-writing source IP addresses and/or port numbers in the datagrams originated by the EIR terminals 100a-100z, so that a remote host computer 171 would be able to communicate to a roaming EIR terminal using the same IP address even when the EIR terminal roams between the networks 110a-110z and changes its IP address accordingly. Another important advantage afforded by using a router configured to perform NAT in accordance with the invention is providing correct routing of datagrams to and from EIR terminals roaming between the networks 110a-110z in a situation when the address spaces of two or more local networks 110a-110z partially or even fully overlap.

The gateway router 150k can maintain a NAT table 510 containing a NAT entry for every EIR terminal. The gateway router 150k can create a new NAT entry upon receiving a registration request message from a roaming EIR terminal.

A NAT table entry can comprise at least some of the fields shown in FIG. 5b, including an external IP address 512 and an internal IP address 514 of an EIR terminal identified by the EIR terminal identifier 511. In one embodiment, the terminal identifier can be provided, e.g., by the terminal serial number, or by a MAC address of one of the terminal's network interfaces. In another embodiment, the terminal identifier can be provided by the terminal home address, which can be associated with the terminal's home network. In a further embodiment, the terminal identifier can be provided by the combination of the terminal home address and the home network identifier. In one aspect, the home network identifier can be provided, e.g., by the network's Service Set Identifier (SSID). A skilled artisan would appreciate the fact that other fields can be included in the structure of a NAT entry.

The external IP address can be used by any computer in communication with the gateway router 150k (e.g., by the host computer 171, or by a peer EIR terminal) to communicate with an EIR terminal connected to one of the networks 110a, 100b. The external IP address can belong to an address range associated with the network 110z on which the router 150k has at least one interface, The internal IP address can belong to an address range associated with one of the local networks 110a-110b, e.g., by having the network part matching the network prefix of one of the local networks 110a-110b, by having the network part matching the network prefix of the network 110z on which the router 150k has at least one interface. The internal IP address can belong to an address range associated with one of the local networks 110a-110b, e.g., by having the network part matching the network prefix of one of the local networks 110a-110b. Gateway router 150k can be adapted to intercept IP datagrams addressed to and originated by the EIR terminals 110a-110z, and perform network address translation including the steps of executing a NAT table lookup and re-writing the destination IP address field of the IP datagrams addressed to the EIR terminal by replacing the terminal's external IP address with the corresponding internal IP address found in the NAT table, and re-writing the source IP address field of the IP datagrams originated by the EIR terminal by replacing the terminal's internal IP address with the corresponding external IP address found in the NAT table.

A roaming EIR terminal can be adapted to acquire (e.g., via DHCP) a new internal IP address upon associating with one of the networks 110a-110b. In one embodiment, the EIR terminal can transmit to the gateway router 150k a registration request message containing the newly acquired IP address and a terminal identifier.

Upon receiving the registration request message, the gateway router 150k can be programmed to create a NAT entry corresponding to the EIR terminal which transmitted the registration request message, to reflect the new internal IP address of an EIR terminal identified by the terminal identifier contained in the registration request message.

Since the external IP address of a roaming EIR terminal does not change, the EIR terminal 110 can maintain all the active communication sessions using the external IP address when roaming between the networks 110a-110z.

In another embodiment, one external IP address can be used to route IP datagrams to and from one or more EIR terminals. This can be achieved by assigning one or more TCP/UDP port numbers to each EIR terminal in communication with one of the networks 110a-110z. A NAT table entry for an EIR terminal identified by the EIR terminal identifier 511 can include an external IP address 512, an external TCP/UDP port 516 port, and an internal IP address 514 of the EIR terminal. If more than one TCP/UDP port is needed for an EIR terminal, then the NAT table entry can further include the internal TCP/UDP port field 518. A skilled artisan would appreciate the fact that other fields can be included in the structure of a NAT entry.

In one embodiment, the address spaces of two or more local networks 110a-110z can partially or fully overlap. For example, two or more local networks 110a-110z can use the same private internet address space defined in RFC 1918 by Network Working Group. To provide for network layer connectivity outside the respective local network 110a-110b, local routers 140a-140b can be adapted to perform NAT and translate each EIR terminal internal IP address belonging to a local network's address space to an external IP address belonging to the address space of the network 110z interconnecting the routers 140a-140b and the gateway router 150k. The address space of the network 110z can be provided by a public internet address range or a private internet address range defined in RFC 1918. Gateway router 150k can be adapted to perform NAT by translating the network's 110z addresses into public IP addresses, thus providing for correct datagram delivery between a roaming EIR terminal and a remote host computer 171.

Since the address spaces of two or more local networks 110a-110z can overlap, and since the terminal MAC address would not be found in a datagram delivered from a terminal 100a-100z via a router 140a-140b to the gateway router 150k, in order for the gateway router 150k to create a new NAT entry for an EIR terminal roaming from a home network to a foreign network, the EIR terminal can transmit to the gateway router 150k a registration request message containing the newly acquired internal IP address, the foreign network identifier, and a terminal identifier. The terminal identifier can be provided, e.g., by the terminal's serial number, or by a MAC address of one of the terminal network interfaces. In another embodiment, the terminal identifier can be provided by the combination of the terminal home address and the home network identifier. In one aspect, the home network identifier can be provided, e.g., by the network's Service Set Identifier (SSID).

In another aspect, the gateway router 150*k* providing NAT services for a roaming EIR terminal 100*a*, can be adapted to maintain in its memory a roaming buffer which can be used to buffer TCP packets addressed by an external TCP server to an EIR terminal having a NAT entry in the NAT table maintained by the gateway router. The receiving EIR terminal can transmit one or more TCP packets back to the external TCP server. In accordance with TCP protocol defined by RFC 793 by Network Working Group, any TCP packet contains an acknowledgement field containing the sequence number of the last data byte successfully received by the packet sender. The gateway router can analyze TCP packets initiated by the EIR terminal and remove from the buffer the TCP packets which have been acknowledged by the EIR terminal. The gateway router can forward zero or more buffered TCP packets to the destination EIR terminal responsive to receiving a registration request message from the destination EIR terminal.

A skilled artisan would appreciate the fact that other network and transport layer protocols with acknowledgments are within the scope and the spirit of the invention.

Data-link layer (OSI layer 2) behavior of a roaming EIR terminal is now being described with references to FIG. 6. In one aspect, an EIR terminal 100 which is being physically moved (e.g., by the terminal operator) from the wireless transmission range of the wireless AP or portal 140*a* in communication with the network 110*a* into the wireless transmission range of the wireless AP or portal 140*b* in communication with the network 110*b*, can determine whether it is necessary to initiate a roaming procedure by ascertaining whether one or more of the following roaming conditions has been satisfied:

a. receive signal strength indication (RSSI) from the wireless AP or portal the EIR terminal is currently associated with, being too low;

b. difference between RSSI of the wireless AP or portal the EIR terminal is currently associated with and another wireless AP or portal being larger than a pre-defined threshold;

c. excessive interference or noise in the network the EIR terminal is currently associated with;

d. excessive number of unsuccessful attempts to re-associate with the wireless AP or portal the EIR terminal is currently associated with;

e. insufficient capacity of the wireless AP or portal the EIR terminal is currently associated with; or f. transmission errors exceeding a pre-defined threshold.

A skilled artisan would appreciate the fact that other types of events triggering a roaming procedure initiation by an EIR terminal are within the scope and the spirit of the invention.

In another aspect, a wireless AP or portal can be provided, e.g., by an infrastructure AP or portal, or by a mesh point terminal providing IEEE 802.11-conformant wireless distribution system services to its peer EIR terminals.

In a further aspect, responsive to determining that a roaming procedure needs to be initiated, the roaming EIR terminal can disassociate with the current wireless AP or portal, by sending a Disassociate request 610, to which the current wireless AP or portal can reply by sending a Disassociate response 620. Upon disassociating with the current wireless AP or portal, the EIR terminal can send an Associate request 630 to another wireless AP or portal. The association procedure can be completed by the wireless AP or portal replying with an Associate response 640.

In a further aspect, the association procedure can be followed by the EIR terminal authenticating with the new wireless AP or portal, and/or exchanging encryption keys.

Figure 7:
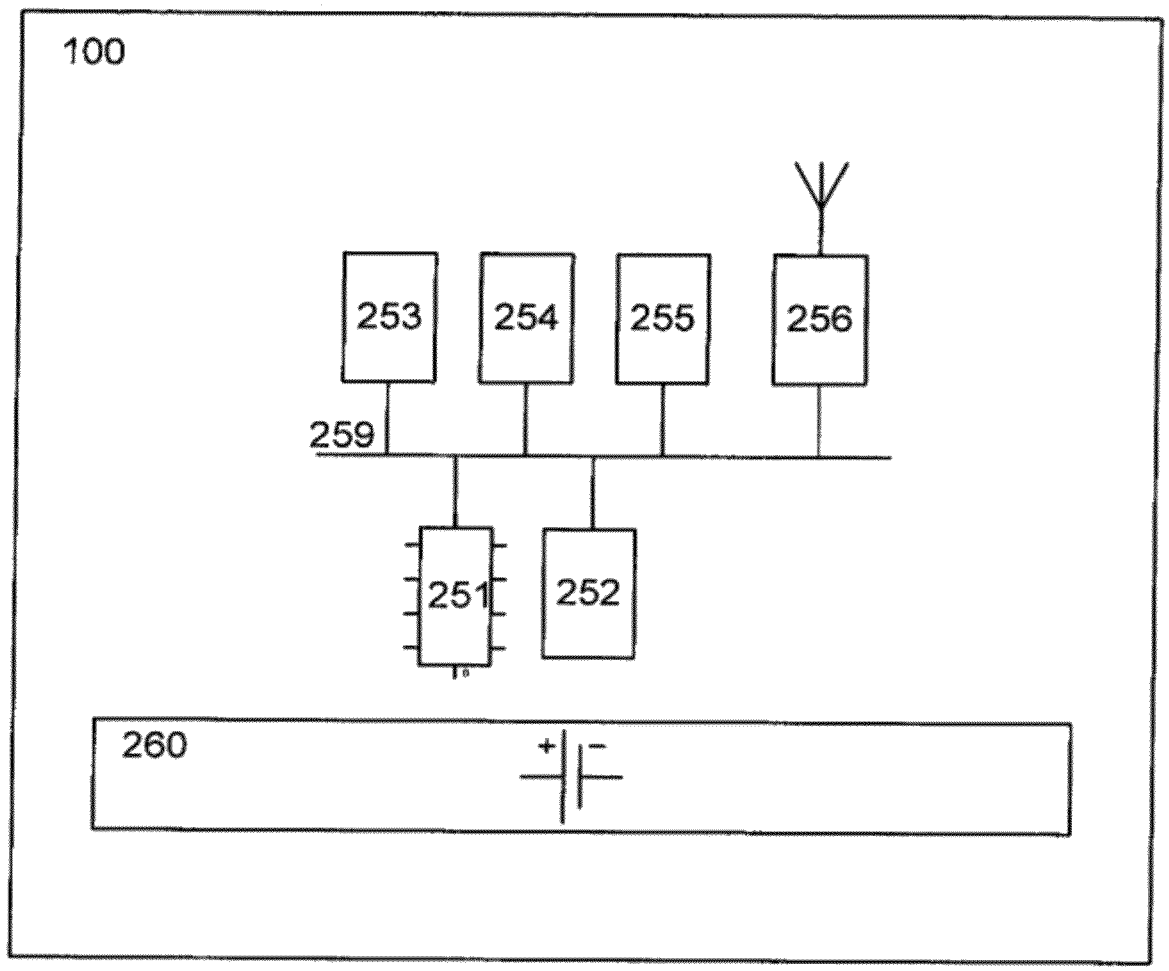
FIG. 7 illustrates a component diagram of an EIR terminal according to the invention.

Now referring to attributes of EIR terminal 100 in further reference to FIG. 7, an EIR terminal 100 according to the invention can comprise a central processing unit (CPU) 251 and a memory 252, both coupled to a system bus 259. In one embodiment, the CPU 251 can be provided by a general purpose microprocessor. The EIR terminal 100 can further comprise one or more encoded information reading (EIR) devices 253, including a bar code reading device, an RFID reading device, and a card reading device, also coupled to the system bus 259. In one embodiment, an EIR reading device can be capable of outputting decoded message data corresponding to an encoded message. In another embodiment, the EIR reading device can output raw message data containing an encoded message, e.g., raw image data or raw RFID data, to be processed by the CPU 251. The EIR terminal module 100 can further comprise a keyboard interface 254 and a display adapter 255, both also coupled to the system bus 259. The EIR terminal 100 can further comprise one or more wireless communication interfaces 256, also coupled to the system bus 259. The EIR terminal 100 can further comprise a battery 260.

Form factors and housings for the EIR terminal according to the invention are now being described. The components of EIR terminal 100 can be incorporated into a variety of different housings. As indicated by the embodiment of FIGS. 8*a* and 8*b*, the components of FIG. 7 can be incorporated into a hand held housing 101. EIR terminal 100 of FIGS. 8*a* and 8*b* is in the form factor of a hand held portable data terminal. EIR terminal 100 as shown in FIGS. 8*a* and 8*b* includes a keyboard 1090, a display 504 having an associated touch screen overlay, a card reader 1348, and an imaging module 360 which includes the components of imaging assembly as described herein; namely, image sensor array incorporated on an image sensor IC chip. Imaging module 360 has an associated imaging axis, $a_i$. As indicated by the side view of FIG. 8*b*, the components of the block diagram of FIG. 7 may be supported within housing 101 on a plurality of circuit boards 1077. Imaging module 360 may include an image sensor array having color sensitive pixels as described in Provisional Patent Application Nos. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 9A:
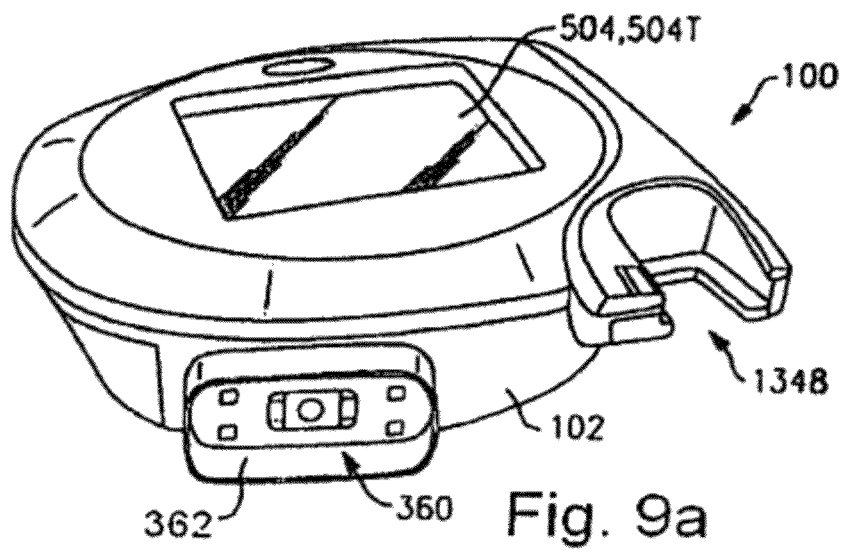
FIGS. 9a-9c illustrate an exemplary portable and remountable EIR terminal housing.
Figure 9B:
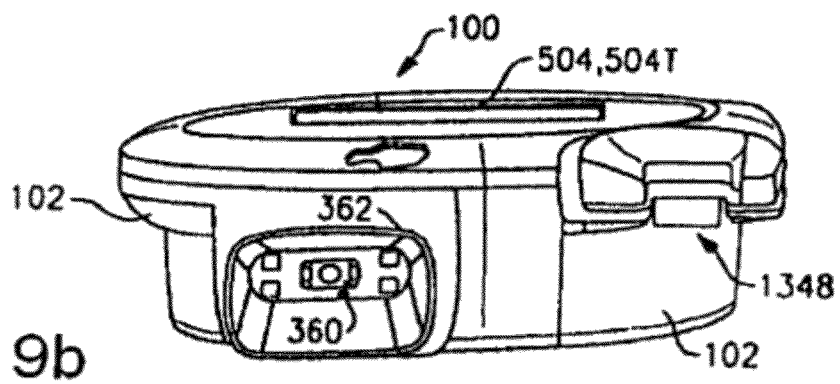
Figure 9C:
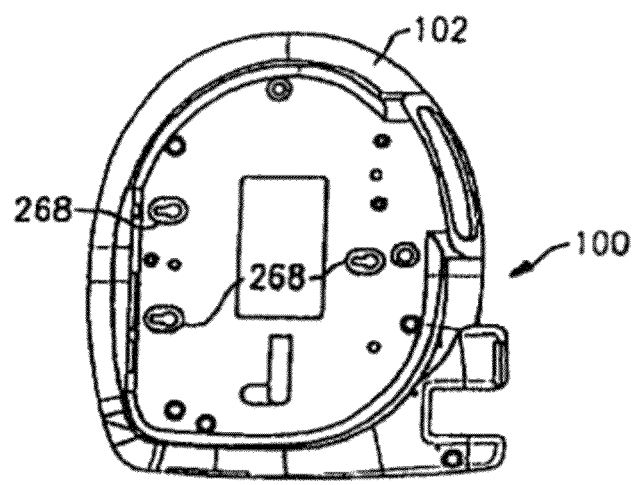

In the embodiment of FIGS. 9*a*-9*c*, the EIR terminal 100 is in the form of a transaction terminal which may be configured as a retail purchase transaction terminal or as a price verifier. Housing 102 of the transaction terminal shown in FIGS. 9*a*-9*c* is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 10*b*). Referring to bottom view of FIG. 9*c*, the housing 102 of the EIR terminal 100 has formations 268 facilitating the replaceable mounting of EIR terminal 100 on a fixed structure. Referring now to FIG. 9*b*, EIR terminal 100 includes a display 504 having an associated touch screen 504T, a card reader 1348, an imaging module 360, and a luminous shroud 362. When light from the illumination block (not shown in FIG. 8) strikes luminous shroud 362, the shroud glows to attract attention to the location of imaging assembly. In certain operating modes as indicated in FIG. 10c, the EIR terminal 100 in accordance with any of FIGS. 9a-9c, displays on display 504 a PIN entry screen prompting a customer to enter PIN information into touch screen 504T. In other operating modes, as indicated in FIG. 10d, the EIR terminal 100 displays on display 504 a signature prompt screen prompting a customer to enter signature information into the device with use of a stylus 505.

Figure 10A:
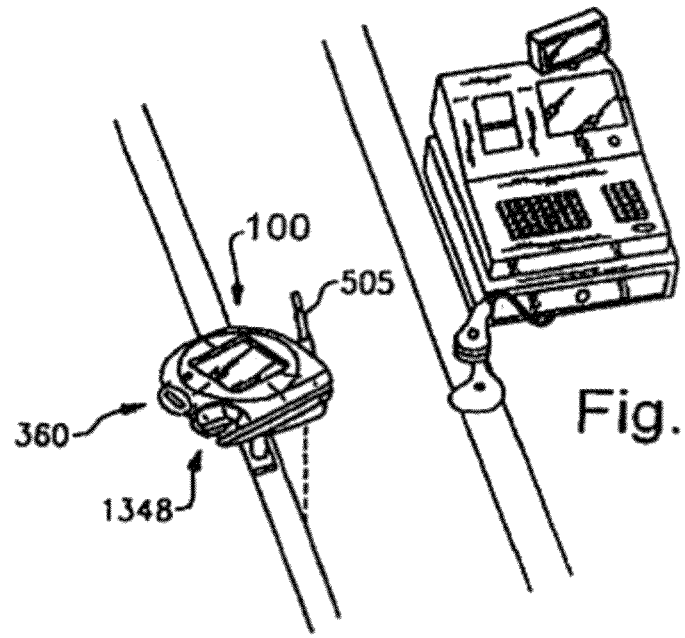
FIG. 10a illustrates a first exemplary deployment of an EIR terminal according to the invention within a retail store.
Figure 10C:
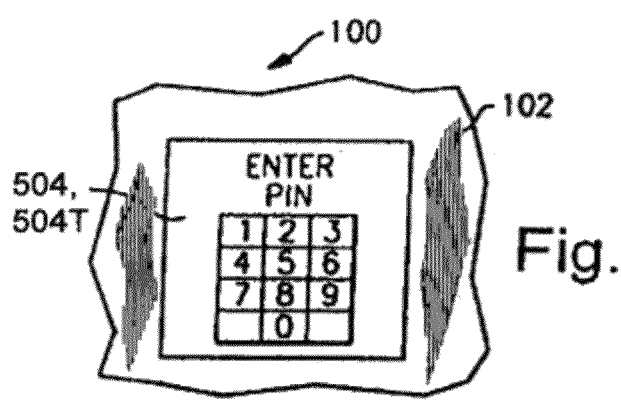
FIGS. 10c and 10d illustrate PIN and signature data entry operational modes of an EIR terminal according to the invention.
Figure 10B:
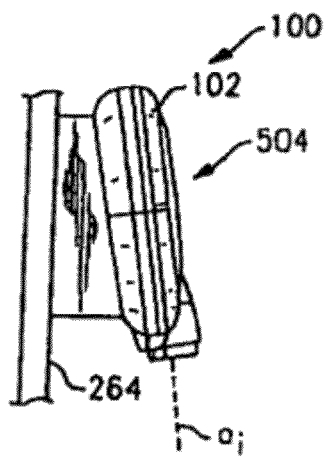
FIG. 10b illustrates a second exemplary deployment of an EIR terminal according to the invention within a retail store.
Figure 10D:
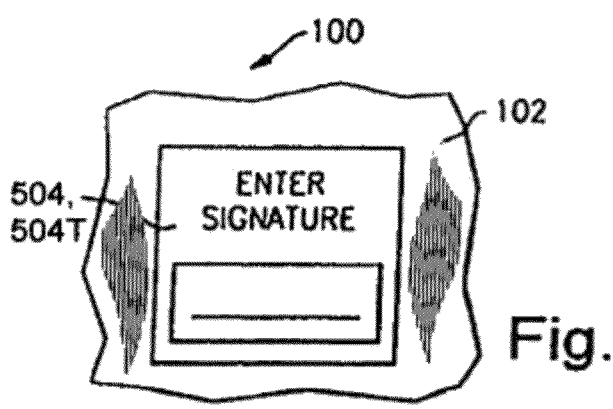

Referring to FIGS. 10a and 10b, various installation configurations for the EIR terminal of FIGS. 9a-9c are shown. In the view of FIG. 10a, the EIR terminal 100 is installed as a retail purchase transaction terminal at a point of sale cashier station. In the setup of FIG. 10a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 10b, the EIR terminal 100 is configured as a price verifier to aid customers in checking prices of products located on a store floor. EIR terminal 100 may be mounted on a shelf (not shown in FIG. 10b) or on a column 264 or other fixed structure of the retail store. EIR terminal 100 may decode bar code data from bar codes on store products and transmit decoded out bar code messages to a store server for lookup of price information which is sent back from the store server to terminal 100 for display on display 504.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. In particular, while the present invention has been described with reference to Internet Protocol (IP) networks, it is recognized that other network addressing schemes and standards are within the scope and the spirit of the invention.

Further, where exemplary embodiments are described with reference to a certain number of elements it will be understood that the exemplary embodiments can be practiced utilizing less than the certain number of elements.

A portable encoded information reading (EIR) terminal for incorporation in a data collection system having a host computer, a plurality of peer EIR terminals, and a plurality of interconnected networks including one or more wireless networks, can comprise a central processing unit (CPU), a memory, an encoded information reading (EIR) device, and at least one wireless communication interface. The EIR terminal can be associated with a home network and have a home address belonging to the address range associated with the home network. The EIR terminal can participate in one or more communication sessions and exchange messages, at least one of which can include decoded message data corresponding to an encoded message, with the host computer. The EIR terminal can maintain active communication sessions using its home address when roaming between the interconnected networks.

A small sample of systems, apparatuses and methods described herein is as follows:

A1. A portable encoded information reading (EIR) terminal for incorporation in a data collection system having a plurality of peer EIR terminals and a plurality of interconnected networks including one or more wireless networks, said EIR terminal associated with a home network having an associated address range, said home network being one of said plurality of networks, said EIR terminal configured to provide IEEE 802.11-conformant wireless distribution system services, including association, disassociation, distribution, integration, and re-association, to said peer EIR terminals, said EIR terminal comprising:

a central processing unit (CPU);

a memory;

an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;

at least one wireless communication interface;

wherein said EIR terminal is configured, when roaming from a first network of said plurality of networks to a second network of said plurality of networks, to maintain zero or more active communication sessions with at least one remote host computer using a home address belonging to said associated address range of said home network; and wherein said EIR terminal is further configured to receive an agent advertisement message when in communication with a foreign network other than said home network, said agent advertisement message containing one or more care-of addresses.

A2. The EIR terminal of A1, wherein said zero or more active communication sessions is provided by at least one active communication session including at least one message transmitted by said EIR terminal, said at least one message including decoded message data corresponding to said encoded message.

A3. The EIR terminal of A1, wherein said EIR terminal is further configured to transmit an agent solicitation message.

A4. The EIR terminal of A1, wherein at least one network of said plurality of networks is an OSI layer 2 network.

A5. The EIR terminal of A1, wherein said home address and said care-of address are Internet Protocol (IP) addresses.

A6. The EIR terminal of A1, wherein said first network has at least one first network wireless access device selected from the group consisting of: a wireless access point (AP), a wireless portal;

wherein second network has at least one second network wireless access device selected from the group consisting of: a wireless access point (AP), a wireless portal; and wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first predefined threshold; excessive interference or noise in said first network; excessive number of unsuccessful attempts to re-associate with said first network wireless access device; insufficient capacity of said first network wireless access device; and transmission errors exceeding a second pre-defined threshold.

B1. A portable encoded information reading (EIR) terminal for incorporation in a data collection system having a plurality of peer EIR terminals and a plurality of interconnected networks including one or more wireless networks, said EIR terminal associated with a home network having an associated address range, said home network being one of said plurality of networks, said EIR terminal configured to be associated with a care-of address when in communication with a foreign network other than said home network, said EIR terminal configured to provide IEEE 802.11-conformant wireless distribution system services, including association, disassociation, distribution, integration, and re-association, to said peer EIR terminals, said EIR terminal comprising:
a central processing unit (CPU);
a memory;
an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;
at least one wireless communication interface;
wherein said EIR terminal is configured, when roaming from a first network of said plurality of networks to a second network of said plurality of networks, to maintain zero or more active communication sessions with at least one remote host computer using a home address belonging to said associated address range of said home network; and
wherein said EIR terminal is further configured to transmit a registration request message to one of: a home agent having a home agent address and being in communication with said home network, a foreign agent in communication with said foreign network, said registration request message including said home address, said home agent address, and said care-of address.

B2. The EIR terminal of B1, wherein said zero or more active communication sessions is provided by at least one active communication session including at least one message transmitted by said EIR terminal, said at least one message including decoded message data corresponding to said encoded message.

B3. The EIR terminal of B1, wherein said registration request message contains an authentication extension.

B4. The EIR terminal of B1, wherein at least one network of said plurality of networks is an OSI layer 2 network.

B5. The EIR terminal of B1, wherein said home address and said care-of address are Internet Protocol (IP) addresses.

B6. The EIR terminal of B1, wherein said first network has at least one first network wireless access device selected from the group consisting of: a wireless access point (AP), a wireless portal;
wherein second network has at least one second network wireless access device selected from the group consisting of: a wireless access point (AP), a wireless portal; and
wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

C1. A portable encoded information reading (EIR) terminal for incorporation in a data collection system having a plurality of peer EIR terminals and a plurality of interconnected networks including one or more wireless networks, said EIR terminal associated with a home network having an associated address range, said home network being one of said plurality of networks, said EIR terminal configured to be associated with a care-of address when in communication with a foreign network other than said home network, said EIR terminal configured to provide IEEE 802.11-conformant wireless distribution system services, including association, disassociation, distribution, integration, and re-association, to said peer EIR terminals, said EIR terminal comprising:
a central processing unit (CPU);
a memory;
an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;
at least one wireless communication interface;
wherein said EIR terminal is configured, when roaming from a first network of said plurality of networks to a second network of said plurality of networks, to maintain zero or more active communication sessions with at least one remote host computer using a home address belonging to said associated address range of said home network; and
wherein said EIR terminal is further configured to receive datagrams addressed to said care-of address.

C2. The EIR terminal of C1, wherein said zero or more active communication sessions is provided by at least one active communication session including at least one message transmitted by said EIR terminal, said at least one message including decoded message data corresponding to said encoded message.

C3. The EIR terminal of C1, wherein at least one network of said plurality of networks is an OSI layer 2 network.

C4. The EIR terminal of C1, wherein said home address and said care-of address are Internet Protocol (IP) addresses.

C5. The EIR terminal of C1, wherein said first network has at least one first network wireless access device selected from the group consisting of: a wireless access point (AP), a wireless portal;
wherein second network has at least one second network wireless access device selected from the group consisting of: a wireless access point (AP), a wireless portal; and
wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

D1. A data collection system comprising:
a plurality of interconnected networks including one or more wireless networks;
a router configured to route datagrams between said plurality of networks and at least one remote host computer;
a plurality of EIR terminals, each EIR terminal associated with a home network having an associated address range, said home network being one of said plurality of networks, each EIR terminal comprising a central processing unit (CPU), a memory, at least one wireless communication interface, and an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;

wherein at least one EIR terminal of said plurality of EIR terminals is configured to provide IEEE 802.11-conformant wireless distribution system services, including association, disassociation, distribution, integration, and re-association, to said peer EIR terminals;

wherein said at least one EIR terminal is configured, when roaming from a first network of said plurality of networks to a second network of said plurality of networks, to be associated with a care-of address when in communication with a foreign network other than said home network, and to maintain zero or more active communication sessions with said at least one host computer using a home address belonging to said associated address range of said home network; and wherein said at least one EIR terminal is further configured to transmit a registration request message to one of: a home agent having a home agent address and being in communication with said home network, a foreign agent in communication with said foreign network, said registration request message including said home address, said home agent address, and said care-of address.

D2. The data collection system of D1, wherein said zero or more active communication sessions is provided by at least one active communication session including at least one message transmitted by said EIR terminal, said at least one message including decoded message data corresponding to said encoded message.

D3. The data collection system of D1, wherein said home agent is configured to maintain a mobility binding table containing a plurality of mobility binding entries, each mobility biding entry containing a home address, and a care-of address of an EIR terminal of said plurality of EIR terminals.

D4. The data collection system of D1, wherein said foreign agent is configured to maintain a visitor list containing a plurality of visitor list entries, each visitor entry containing a home address, a home agent address, and a MAC address of an EIR terminal of said plurality of EIR terminals.

D5. The data collection system of D1, wherein said foreign agent is configured to maintain a visitor list containing a plurality of visitor list entries, each visitor entry containing a co-located care-of address, a home agent address, and a MAC address of an EIR terminal of said plurality of EIR terminals.

D6. The data collection system of D1, wherein said home agent is configured to intercept datagrams addressed to said at least one EIR terminal and forward said intercepted datagrams to said care-of address.

D7. The data collection system of D1, wherein said foreign agent is configured to maintain a visitor list containing a plurality of visitor list entries, each visitor entry containing a home address, a home agent address, and a MAC address of an EIR terminal of said plurality of EIR terminals; and wherein said foreign agent is configured, upon receiving a datagram addressed to said care-of address, to retrieve a MAC address of said EIR terminal from said visitor list and forward said datagram to said MAC address.

D8. The data collection system of D1, wherein at least one network of said plurality of networks is an OSI layer 2 network.

D9. The data collection system of D1, wherein said home address, said home agent address, and said care-of address are Internet Protocol (IP) addresses.

D10. The data collection system of D1, wherein said home agent is configured to maintain a roaming buffer for buffering MAC frames addressed to said at least one EIR terminal;

wherein said home agent is further configured to start buffering MAC frames addressed to said at least one EIR terminal in said roaming buffer responsive to a first triggering event; and wherein said home agent is further configured to forward buffered MAC frames addressed to said at least one EIR terminal responsive to a second triggering event.

D11. The data collection system of D1, wherein said first triggering event is selected from the group consisting of: receiving a notification from said at least one EIR terminal that said EIR terminal is entering a power save mode; receiving a disassociation request from said at least one EIR terminal; and not receiving, within a pre-defined timeout, an acknowledgement from said at least one EIR terminal responsive to transmitting a unicast MAC frame to said at least one EIR terminal.

D12. The data collection system of D1, wherein said second triggering event is selected from the group consisting of: receiving a power save poll frame from said at least one EIR terminal; receiving a re-association request from said at least one EIR terminal; receiving from said at least one EIR terminal an acknowledgement for a previously transmitted unicast MAC frame; receiving a registration request message from said at least one EIR terminal.

D13. The EIR terminal of D1, wherein said first network has at least one first network wireless access device selected from the group consisting of: a wireless access point (AP), a wireless portal;

wherein second network has at least one second network wireless access device selected from the group consisting of: a wireless access point (AP), a wireless portal; and wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

E1. A data collection system comprising:

a plurality of interconnected networks including one or more wireless networks;

a router configured to route datagrams between said plurality of networks and at least one remote host computer;

a plurality of EIR terminals, each EIR terminal associated with a home network having an associated address range, said home network being one of said plurality of networks, each EIR terminal comprising a central processing unit (CPU), a memory, at least one wireless communication interface, and an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;

wherein said at least one EIR terminal is configured, when roaming from a first network of said plurality of networks to a second network of said plurality of networks, to be associated with a care-of address when in communication with a foreign network other than said home network, and to maintain zero or more active communication sessions with said at least one host computer using a home address belonging to said associated address range of said home network;

wherein said at least one EIR terminal is further configured to transmit a registration request message to one of: a home agent having a home agent address and being in communication with said home network, a foreign agent in communication with said foreign network, said registration request message including said home address, said home agent address, said care-of address; and wherein said home agent is configured to maintain a roaming buffer for buffering MAC frames addressed to said at least one EIR terminal, said home agent further configured to start buffering MAC frames addressed to said at least one EIR terminal in said roaming buffer responsive to a first triggering event, said home agent further configured to forward buffered MAC frames addressed to said at least one EIR terminal responsive to a second triggering event.

E2. The data collection system of E1, wherein said first triggering event is selected from the group consisting of: receiving a notification from said at least one EIR terminal that said EIR terminal is entering a power save mode; receiving a disassociation request from said at least one EIR terminal; and not receiving, within a pre-defined timeout, an acknowledgement from said at least one EIR terminal responsive to transmitting a unicast MAC frame to said at least one EIR terminal.

E3. The data collection system of E1, wherein said second triggering event is selected from the group consisting of: receiving a power save poll frame from said at least one EIR terminal; receiving a re-association request from said at least one EIR terminal; receiving from said at least one EIR terminal an acknowledgement for a previously transmitted unicast MAC frame; receiving a registration request message from said at least one EIR terminal.

F1. A data collection system comprising:

a plurality of interconnected networks including one or more wireless networks;

a router configured to route datagrams between said plurality of networks and at least one remote host computer;

a plurality of EIR terminals, each EIR terminal comprising a central processing unit (CPU), a memory, at least one wireless communication interface, and an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;

wherein said router is configured to maintain a network address translation (NAT) table, said NAT table comprising at least one NAT entry, said at least one NAT entry including an internal address associated with an EIR terminal of said plurality of EIR terminals;

wherein said EIR terminal is further configured, when roaming from a first network of said plurality of networks to a second network of said plurality of networks, to maintain zero or more active communication sessions with said at least one host computer using an external address; and wherein said EIR terminal is configured to acquire a new internal address upon associating with a network of said plurality of interconnected networks.

F2. The data collection system of F1, wherein said zero or more active communication sessions is provided by at least one active communication session including at least one message transmitted by said EIR terminal, said at least one message including decoded message data corresponding to said encoded message.

F3. The data collection system of F1, wherein said router is further configured to intercept at least one datagram originated by said EIR terminal, said at least one datagram including a source address field, said router further configured to re-write said source address field with said external address.

F4. The data collection system of F1, wherein said router is further configured to intercept at least one datagram addressed to said EIR terminal, said at least one datagram including a destination address field, said router further configured to re-write said destination address field with said internal address.

F5. The data collection system of F1, wherein said EIR terminal has a terminal identifier and is associated with a home network having an associated address range, and is further associated with a home address, said home network being one of said plurality of networks, said home address belonging to said associated address range of said home network; and wherein said EIR terminal is further configured to transmit a registration request message to said router, said registration request message including said terminal identifier and said new internal address.

F6. The data collection system of F1, wherein said EIR terminal has a terminal identifier and is associated with a home network having a home network identifier and an associated address range, and is further associated with a home address, said home network being one of said plurality of networks, said home address belonging to said associated address range of said home network, said terminal identifier provided by one of: said home address, a combination of said home address and said home network identifier, a MAC address associated with said at least one wireless communication interface, a serial number of said EIR terminal; and wherein said EIR terminal is further configured to transmit a registration request message to said router, said registration request message including said terminal identifier and said new internal address.

F7. The data collection system of F1, wherein said at least one NAT entry further includes one of: an external address associated with said EIR terminal, an external port associated with said EIR terminal.

F8. The data collection system of F1, wherein said at least one NAT entry further includes an internal port associated with said EIR terminal.

F9. The data collection system of F1, wherein said EIR terminal has a terminal identifier; and wherein said at least one NAT entry further includes said terminal identifier.

F10. The data collection system of F1, wherein said EIR terminal has a terminal identifier and is associated with a home network having a home network identifier and an associated address range, and is further associated with a home address, said home network being one of said plurality of networks, said home address belonging to said associated address range of said home network, said terminal identifier provided by one of: said home address, a combination of said home address and said home network identifier, a MAC address associated with said at least one wireless communication interface, a serial number of said EIR terminal; and wherein said at least one NAT entry further includes said terminal identifier.

F11. The data collection system of F1, wherein at least one network of said plurality of networks is an OSI layer 2 network.

F12. The data collection system of F1, wherein said internal address and said external address are Internet Protocol (IP) addresses.

F13. The data collection system of F1, wherein at least one EIR terminal of said plurality of EIR terminals is configured to provide IEEE 802.11-conformant wireless distribution system services, including association, disassociation, distribution, integration, and re-association, to said peer EIR terminals.

F14. The data collection system of F1, wherein said gateway router is further configured to maintain a roaming buffer for buffering TCP packets addressed to said at least one EIR terminal;
wherein said gateway router is further configured to remove one or more TCP packets from said roaming buffer responsive to said at least one EIR terminal acknowledging receipt of said one or more TCP packets; and
wherein said gateway router is further configured to forward buffered TCP packets addressed to said at least one EIR terminal responsive to receiving a registration request message from said at least one EIR terminal.

F15. The data collection system of F1, wherein at least one said local router in communication with a local network is configured maintain a local network address translation (NAT) table, said local NAT table comprising at least one local NAT entry, said at least one local NAT entry including an internal address associated with an EIR terminal in communication with said local network.

F16. The data collection system of F1, wherein address spaces associated with two or more said local networks at least partially overlap.

F17. The EIR terminal of F1, wherein said first network has at least one first network wireless access device selected from the group consisting of: a wireless access point (AP), a wireless portal;
wherein second network has at least one second network wireless access device selected from the group consisting of: a wireless access point (AP), a wireless portal; and
wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

G1. A portable encoded information reading (EIR) terminal for incorporation in a data collection system having a plurality of peer EIR terminals and a plurality of interconnected wireless networks, said EIR terminal associated with a home network having an associated address range, said home network being one of said plurality of networks, said EIR terminal comprising:
a central processing unit (CPU);
a memory;
an encoded information reading (EIR) device selected from the group consisting of: a bar code reading device, an RFID reading device, and a card reading device, said EIR device configured to perform one of: outputting raw message data containing an encoded message, outputting decoded message data corresponding to an encoded message;
at least one wireless communication interface;
wherein said EIR terminal is configured, to maintain zero or more active communication sessions with at least one remote host computer when roaming from a first network of said plurality of networks to a second network of said plurality of networks, said first network having at least one first network wireless access device selected from the group consisting of: a wireless access point (AP) and a wireless portal, said second network having at least one second network wireless access device selected from the group consisting of: a wireless access point (AP) and a wireless portal; and
wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

G2. The EIR terminal of G1, wherein said zero or more active communication sessions is provided by at least one active communication session including at least one message transmitted by said EIR terminal, said at least one message including decoded message data corresponding to said encoded message.

G3. The EIR terminal of G1, wherein said EIR terminal configured to provide IEEE 802.11-conformant wireless distribution system services, including association, disassociation, distribution, integration, and re-association, to said peer EIR terminals.

G4. The EIR terminal of G1, wherein at least one of: said at least one home network wireless AP, said at least one foreign network wireless AP is provided by a peer EIR terminal, said peer EIR terminal said EIR terminal configured to provide IEEE 802.11-conformant wireless distribution system services, including association, disassociation, distribution, integration, and re-association.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. A portable encoded information reading (EIR) terminal for incorporation in a data collection system having a plurality of interconnected networks, said EIR terminal associated with a home network having an associated address range, said home network being one of said plurality of networks, and said EIR terminal comprising: a central processing unit (CPU); a memory; coupled to a bus in communication with the CPU, the EIR device selected from the group consisting of: a bar code reading device, an RFID reading device, and a card reading device, said EIR device configured to output message data, the message data comprising one or more of: decoded message data corresponding to an encoded message, or raw message data containing an encoded message to be processed by the CPU; wherein said EIR terminal registers a care-of address with a home agent by transmitting a registration request to the home agent, the registration request comprising the care-of address and an authentication extension for authenticating the EIR terminal to the home agent, wherein the authenticating facilitates preventing spoofing the EIR terminal; wherein said EIR terminal is configured, when roaming from a first network of said plurality of networks to a second network of said plurality of networks, to maintain an active communication session with a remote host computer using a home address belonging to said associated address range of said home network, the home address for addressing the EIR terminal when providing data of the active communication session across the first network and the second network, wherein the EIR terminal communicates with a remote device to obtain a care-of address, and wherein data provided to the home address is routed to the EIR by way of the obtained care-of address.

2. The EIR terminal of claim 1, wherein said active communication includes at least one message transmitted by said EIR terminal, said at least one message including decoded message data corresponding to said encoded message.

3. The EIR terminal of claim 1, wherein said EIR terminal is further configured, responsive to transmitting an agent solicitation message, to receive an agent advertisement message comprising the care-of address.

4. The EIR terminal of claim 1, wherein at least one network of said first network, second network, or home network is an OSI layer 2 network.

5. The EIR terminal of claim 1, wherein said home address and said care-of address are Internet Protocol (IP) addresses.

6. The EIR terminal of claim 1, wherein said first network has at least one first network wireless access device selected from the group consisting of: a wireless access point (AP), a wireless portal; and
  wherein the second network has at least one second network wireless access device selected from the group consisting of: a wireless access point (AP), a wireless portal.

7. The EIR terminal of claim 1, wherein the obtaining is part of a roaming process of the EIR terminal, and wherein said EIR terminal is further configured to disassociate with said first network and associate with said second network responsive to detection of a roaming process triggering condition selected from the group consisting of:
  receive signal strength indication (RSSI) of said first network wireless access device being too low; difference between RSSI of said first network wireless access device and said second network wireless access device being larger than a first pre-defined threshold; excessive interference or noise in said first network; excessive number of unsuccessful attempts to re-associate with said first network wireless access device; insufficient capacity of said first network wireless access device; and transmission errors exceeding a second pre-defined threshold.

8. A portable encoded information reading (EIR) terminal for incorporation in a data collection system having a plurality of interconnected networks, said EIR terminal associated with a home network having an associated address range, said home network being one of said plurality of networks, and said EIR terminal configured with wireless communication capability and said EIR terminal comprising: a central processing unit (CPU); a memory; coupled to a bus in communication with the CPU, the EIR device selected from the group consisting of: a bar code reading device, an RFID reading device, and a card reading device, said EIR device configured to output message data, the message data comprising one or more of: decoded message data corresponding to an encoded message, or raw message data containing an encoded message to be processed by the CPU; wherein said EIR terminal registers a care-of address with: (i) a home agent having a home agent address and being in communication with said home network, or (ii) a foreign agent in communication with a foreign network other than the home network, by transmitting a registration request to the home agent or foreign agent, the registration request comprising the care-of address and an authentication extension for authenticating the EIR terminal to the home agent or foreign agent, wherein the authenticating facilitates preventing spoofing the EIR terminal; wherein said EIR terminal is configured, when roaming from a first network of said plurality of networks to a second network of said plurality of networks, to maintain an active communication session with a remote host computer using a home address belonging to said associated address range of said home network, the home address for addressing the EIR terminal when providing data of the active communication session across the first network and the second network; and the registration request as part of a registration request message, said registration request message including said home address and the care-of address, wherein data provided to the home address is routed to the EIR by way of the care-of address.

9. The EIR terminal of claim 8, wherein said active communication includes at least one message transmitted by said EIR terminal, said at least one message including decoded message data corresponding to said encoded message.

10. The EIR terminal of claim 8, wherein at least one network of said first network, second network, or home network is an OSI layer 2 network.

11. The EIR terminal of claim 8, wherein said home address and said care-of address are Internet Protocol (IP) addresses.

12. The EIR terminal of claim 8, wherein said first network has at least one first network wireless access device selected from the group consisting of: a wireless access point (AP), a wireless portal; and
  wherein the second network has at least one second network wireless access device selected from the group consisting of: a wireless access point (AP), a wireless portal.

13. The EIR terminal of claim 8, wherein EIR terminal obtains the care-of address as part of a roaming process, and wherein said EIR terminal is further configured to disassociate with said first network and associate with said second network responsive to detection of a roaming process triggering condition selected from the group consisting of: receive signal strength indication (RSSI) of said first network wireless access device being too low; difference between RSSI of said first network wireless access device and said second network wireless access device being larger than a first pre-defined threshold;
  excessive interference or noise in said first network; excessive number of unsuccessful attempts to re-associate with said first network wireless access device; insufficient capacity of said first network wireless access device; and transmission errors exceeding a second pre-defined threshold.

14. The EIR terminal of claim 8, wherein said EIR terminal is further configured to receive datagrams addressed to said care-of address.

15. The EIR terminal of claim 1, wherein the EIR terminal registers the care-of address with a home agent by transmitting a registration request to the home agent, the registration request comprising the care-of address and an authentication extension for authenticating the EIR terminal to the home agent, wherein the authenticating facilitates preventing spoofing the EIR terminal.

16. The EIR terminal of claim 8, wherein the EIR terminal registers the care-of address with a home agent by transmitting a registration request to the home agent, the registration request comprising the care-of address and an authentication extension for authenticating the EIR terminal to the home agent, wherein the authenticating facilitates preventing spoofing the EIR terminal.

* * * * *